Sept. 5, 1950 J. H. ROUNTREE 2,521,669
TORCH BEVELING APPARATUS
Filed Aug. 30, 1945 2 Sheets-Sheet 1

INVENTOR
JOHN H. ROUNTREE
BY
D.C. Harrison
ATTORNEY

Sept. 5, 1950 J. H. ROUNTREE 2,521,669
TORCH BEVELING APPARATUS
Filed Aug. 30, 1945 2 Sheets-Sheet 2
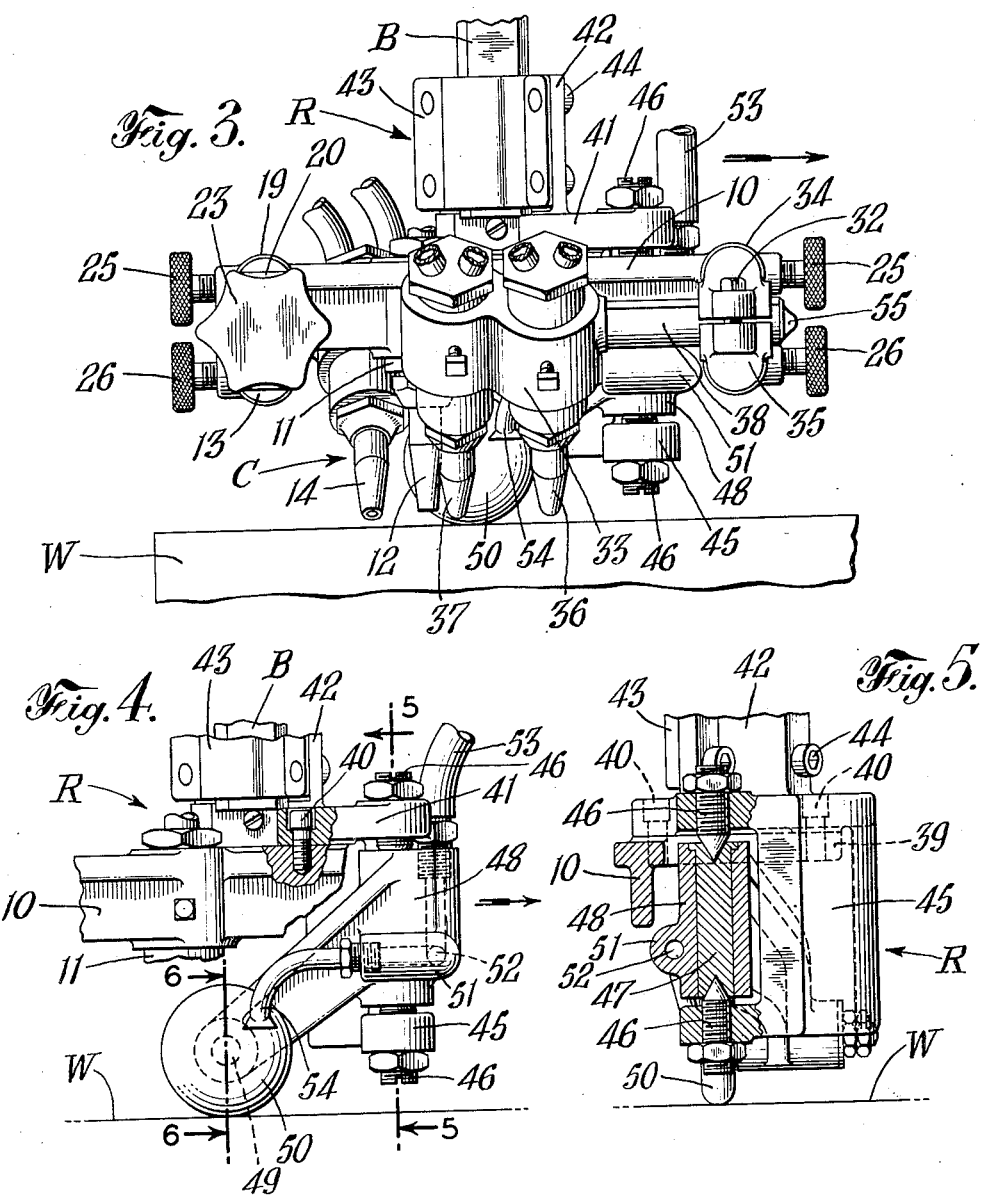
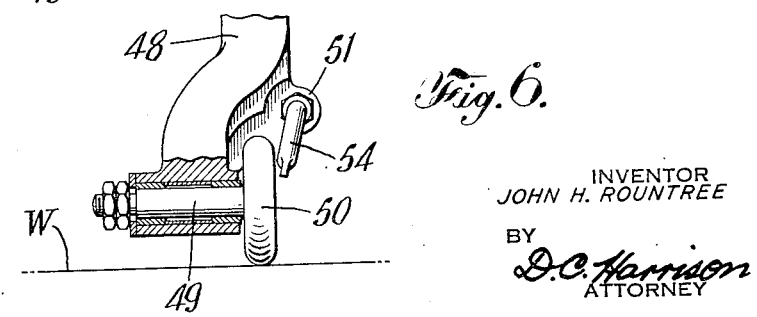
INVENTOR
JOHN H. ROUNTREE
BY
D.C. Harrison
ATTORNEY Patented Sept. 5, 1950

2,521,669

UNITED STATES PATENT OFFICE 2,521,669

TORCH BEVELING APPARATUS

John H. Rountree, Plainfield, N. J., assignor to The Linde Air Products Company, a corporation of Ohio Application August 30, 1945, Serial No. 613,638

8 Claims. (Cl. 266—23)

1

This invention relates to apparatus for multiface edge preparation for welding operations, and has for its main object to meet the edge preparation requirements for automatic welding.

In automatic welding apparatus there is a limit to the depth of penetration of welding heat possible at commercially acceptable welding speeds. Hence, for thicker plates it is customary to bevel the plate edges to reduce the depth of penetration required. Thus, the prepared edge often requires a nose which is produced by a vertical cut, and a bevel which is produced by a bevel cut. The abutting noses produce that part of the joint requiring direct penetration of welding heat, and the bevels produce the welding groove which is filled by weld metal to effect the total weld. Thus, the nose is the primary consideration, the bevel being necessary for access of welding heat to the nose, and therefore secondary.

One form of apparatus for this purpose has comprised a rigid nozzle block for holding the multiple cutting nozzles in the necessary spaced and angular relation to cut the desired edges with a single passage of the cutting equipment. This nozzle block being unitary required the substitution of the entire nozzle block whenever a different angle or nozzle spacing was required.

To produce such edges the cluster is guided to produce the nose, and the bevel nozzles of the cluster are directed to be dependent upon the noes cutting operation. Also, the mutual preheat effects of the nozzles are such that it is desirable to have them as close together as possible. Furthermore, in such single pass multiple cutting, the sequence of cuts is important, because a satisfactory edge cannot be prepared by a jet which has to jump a kerf.

Inasmuch as the accuracy of the angles and contour dimensions of the edges are particularly important for automatic welding, it has been customary to provide a floating mounting for the nozzle cluster which will follow the contour of the plate being prepared. A plate rider roller has been rigidly secured to the nozzle cluster but this has encountered difficulties. The roller axis being fixed, a very slight deviation of the roller axis from the normal to the line of cut produces a cumulative side thrust which ultimately causes a lateral jump of the roller.

Objects of the present invention are therefore to provide a floating multiple nozzle mounting which is readily adjustable to different spacings and angles of bevel cutting jets with respect to the nose cutting jet, to maintain the bevel cutting nozzles close to the nose cutting nozzle in the direction of cut, to automatically maintain the axis of the plate rider roller normal to the line of cut, to maintain the plate rider roller close to the nose cutting nozzle, and to cool the plate rider roller and protect the same from the heat of adjacent nozzles.

In the following description reference will be made to the accompanying drawings in which, Fig. 1 is an end elevation of an "auxiliary kerf" cutting apparatus provided with four cutting nozzles arranged in predetermined angular and spaced relationship, a plate riding assembly and a steel plate, shown partially;

Fig. 3 is a side view of Fig. 1;

Fig. 4 is an elevational view of the fluid-cooled plate-riding assembly taken along line 4—4 of Fig. 2 with parts broken away to show the structure and attachment more clearly;

Fig. 5 is a sectional view taken along line 5—5 of Fig. 4; and

Fig. 6 is a sectional view taken along line 6—6 of Fig. 4.

The structure for propelling the nozzles and the floating mounting thereof is in general similar to that shown in the Chelborg and Pufahl Patent No. 2,373,541. This structure comprises a casing A adapted to be propelled over a work surface along the path of travel. The casing A may be rigidly secured to a portable or straight line cutting machine of the type disclosed in Bucknam Patent No. 2,183,605, dated December 19, 1939, or it may be guided for shape cutting by a sprocket drive from a tracing wheel as shown in Wagner Patent No. 2,087,678.

A floating nozzle cluster C, having a surface engaging member R, oscillates relatively to the casing A in accord with undulations in the work surface, so as to maintain the nozzles in predetermined relation to the work surface. A guide bar B extends upwardly from the member R and is held against undesired lateral and twisting motion by a plurality of anti-friction devices such as guide rollers G journalled in the casing A.

Figure 2:
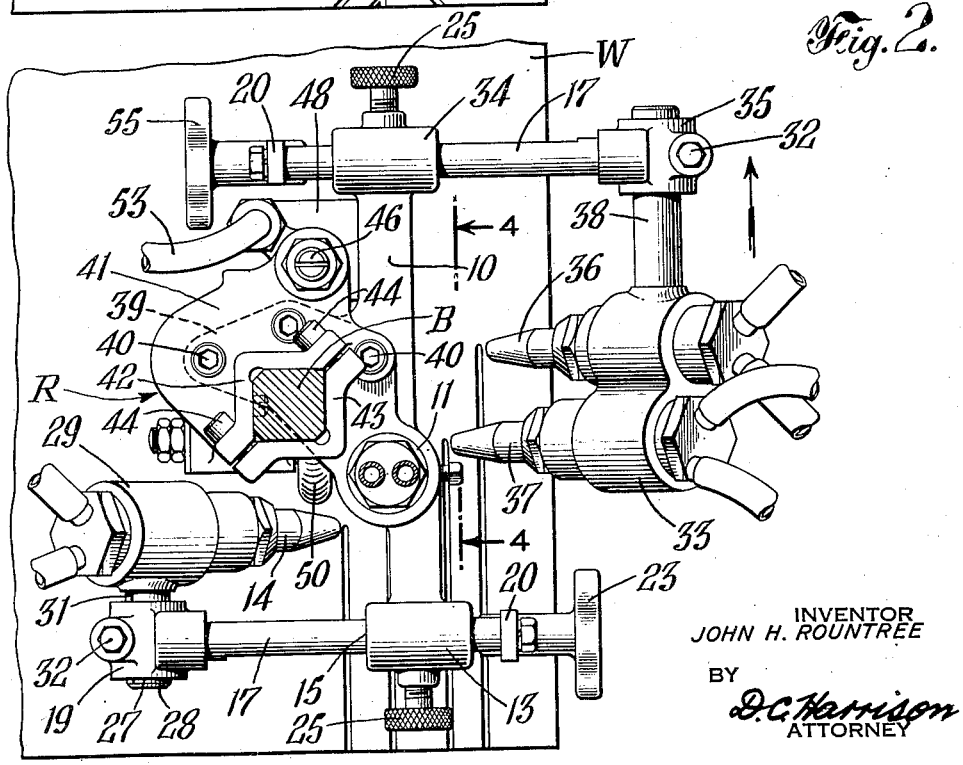
Fig. 2 is a plan view taken along line 2—2 of Fig. 1.

The nozzle cluster C, according to the present invention, as best shown in Fig. 2, comprises a rigid main frame member 10 of bar like construction, which extends longitudinally in the direction of cutting. The member 10 has a boss intermediate its ends to form a fixed nozzle holder or socket 11 for holding a nose cutting nozzle 12 in a substantially vertical position for making a kerf perpendicular to the surface of a metal plate.

Adjacent one end thereof the frame member 10 is formed to provide a transverse guide 13, in which is slidably mounted a supporting arm for the bevel cutting nozzle 14. Preferably the guide 13 is provided with vertically spaced parallel bores 15 and 16, and the supporting arm comprises twin bars 17 and 18 slidably mounted in the bores 15 and 16.

The nozzle ends of the twin bars 17 and 18 are secured to a clamping socket 19 and the opposite ends thereof are secured to a tie plate 20. The guide 13 has a threaded bore 21 which receives an adjusting lead screw 22 which passes through the tie plate 20 and terminates in a handle 23, screw 22 being held against the tie plate by a collar 24. The bars 17 and 18 are held in finger-tight adjusted position on the guide 13 by thumbscrews 25 and 26 so that the lead screw 22 may be turned without loosening the thumbscrews.

The clamping socket 19 comprises a bore 27 for receiving and holding in a substantially horizontal position a nozzle holder shank 28 secured to nozzle holder 29. Both ends of the bore 27 are graduated to indicate the angle of bevel. When nozzle 14 is perpendicular to the workpiece, the sharply defined line 31 on shank 28 is opposite 0°.

The clamping socket 19 comprises a split ring to provide a clamping means for shank 28 when clamping screw 32 is tightened. Manipulation of the clamping screw 32 permits longitudinal and angular adjustment of the bevel nozzle with respect to the fixed nozzle 12 and workpiece W. All nozzles are firmly secured in position in the nozzle holders by set screws passing through the nozzle holders at any convenient location as indicated in the drawings.

It should be noted that while the guide 13 is spaced away from the nozzle holder 11 to make room for the transverse supporting arm and the adjustable lead screw, the nozzle holder shank 28 extends from the clamping socket 19, back toward the nozzle holder 11, so as to locate the nozzle 14 between the guide 13 and the holder 11 and close to the fixed nose cutting nozzle 12.

The adjustable nozzle supporting structure is duplicated at the other end of the frame member 10 for supporting the nozzle holder 33. The frame member 10 is formed to provide a transverse guide 34 in which is slidably mounted the supporting arm for a clamping socket 35 which is disposed ahead and to one side of the fixed nozzle 12 while the clamping socket 19 is to the rear and to the other side of the fixed nozzle 12.

Nozzle holder 33 may be provided with one socket similar to nozzle holder 29 or with two sockets in tandem as shown for holding nozzles 36 and 37 at the same bevel angle for "rip and trim" cutting or at the same or at different bevel angles for "auxiliary kerf" cutting as disclosed respectively in Patent No. 2,184,562 issued December 26, 1939 to H. E. Rockefeller and in my co-pending parent method application Serial No. 485,011 filed April 29, 1943 of which this present application is a continuation-in-part and which is now Patent No. 2,443,710 issued June 22, 1948.

Steel plates up to one inch thick are readily cut by either method but, because of insufficient preheat provided by the "rip and trim" method when cutting thicker plates, the "auxiliary kerf" method is preferred when high cutting speeds are desired. In using the latter method the auxiliary nozzle 36 provides ample preheat for the subsequent nozzles to permit them greater cutting speeds than are obtainable without such additional preheating.

Although nozzle holder 33 is as flexible and as easily adjustable as nozzle holder 29, it is to be noted that the two sockets comprising nozzle holder 33 are in fixed angular and spaced relation with each other and comprise one unit so that any manipulation of the nozzle holder shank 38 will displace both nozzles 36 and 37 the same amount.

Figure 1:
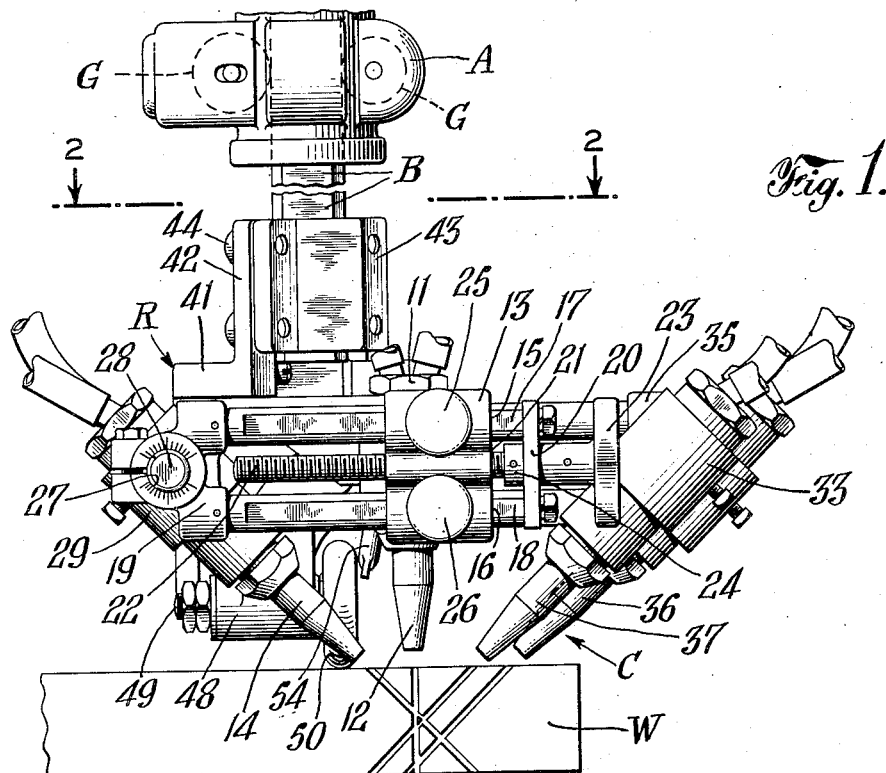

When applying the "auxiliary kerf" method to severing and beveling excessive thicknesses, nozzle 36 is better able to cut through the plate when it is inclined at an angle smaller than that of nozzle 37 than if arranged parallel as shown in Fig. 1. Thus, the auxiliary nozzle 36 makes the first cut, the under-bevel nozzle 37 makes the second and under-bevel cut, the squaring nozzle 12 makes the third and nose cut and the upper bevel nozzle 14 makes the last and upper bevel cut. It is to be noted that both adjustable nozzle holders 29 and 33 are inclined toward the fixed squaring nozzle 12.

The frame member 10 has a lateral portion 39 by means of which it is secured to the guide bar B. The portion 39 is secured by screws 40 to the underside of a clamping plate 41, which has integral therewith a clamp jaw 42. A clamp cap 43 cooperates therewith by means of clamp screws 44 to secure the floating mounting to the guide bar B.

The clamping plate 41 comprises a yoke 45 into the arms of which are threaded pivoted studs 46 which center and secure a pivot bushing 47. An arm 48 is journalled on the bushing 47 and carries a horizontal journal for a shaft 49 which is integral with a plate rider wheel 50. The arm 48 has a boss 51 in which is formed a passage 52, through which air entering through inlet 53 is carried to a curved nozzle 54. This nozzle discharges a cooling jet against the wheel surface and simultaneously blows away any slag in the vicinity of the wheel. The wheel 50 has a rounded periphery to avoid adherence of slag.

It should be noted, as shown in Fig. 3, that the plate rider wheel 50 lies between, and has rolling contact with the work at a point between the bevel cutting nozzles 14 and 36. This arrangement provides the greatest accuracy for both bevel cuts. Also, the swivel axis for the castor wheel 50 is ahead of all of the nozzles in the direction of cut, being between the leading supporting arm and the nozzles, which avoids side thrust on the plate rider wheel while locating the same at the point of maximum accuracy.

With the bevel cutting nozzles 36, 37 and 14 set at the desired angles and in spaced relation with the nose cutting nozzle 12, the operation of producing a double bevel with nose edge is commenced. In many instances either one of the bevel cutting nozzles may be cutting a bevel depth either too large or too small resulting in incorrect nose widths. To move the bevel cutting nozzles perpendicularly away from the kerfs it is only necessary to turn screw knob 23 or 55 clockwise. Since the elongated lead screw 22 engages a threaded portion in bore 21, clockwise manipulation of the knob 23 causes the screw 22 to work into the member 13 thus causing the twin bars 17 and 18 to slide the clamping socket 19 perpendicularly away from the kerfs. Thus if it is desired to decrease the nose width and increase the upper bevel depth, the screw knob 23 is turned clockwise to move the bevel nozzle perpendicularly away from the kerfs. By turning the knob 23 counterclockwise, the bevel cutting nozzle is moved perpendicularly toward the kerf, thus increasing the nose width and decreasing the upper bevel depth. By manipulating screw knob 55 the nose width and the underbevel depth may be adjusted in a similar fashion.

The following constitute some of the inherent advantages as provided by the unique combination which are nonexistent in standard cutting machines. By supporting the clamping socket 19 with twin arms 17 and 18 the twisting of a single arm due to the eccentric loading produced by the nozzle head and holder is overcome. By providing a swivel type wheel in lieu of a rigid type, greater flexibility is obtained to permit the apparatus to follow a predetermined path which will eliminate a jagged or stepped edge as no "hopping" will take place. The rounded riding wheel shows less tendency to pick up slag than the flat surface wheel used on the standard plate riding devices.

In order to follow accurately the undulations contained in the steel plate, the wheel is arranged as closely to the perpendicular kerf as the nose cutting nozzle will permit. When so arranged, the envelope flame of the under bevel cutting nozzle 37 is directed against the wheel 50. Nozzle 54 is provided to emit a jet of cool air to cool wheel 50 to protect it from such envelope flame and at the same time blow away any slag particles in the vicinity of the wheel.

The advantages of the apparatus as disclosed herein over all previously existing nozzle blocks are quite apparent and its relatively simple construction makes it possible for the average operator to make minor transverse adjustment without interrupting the cutting operation, thus making possible greater production of multi-face edge steel plates accurately cut to permit relatively easy subsequent welding operations.

I claim:

1. Plate edge preparation apparatus comprising an elongated rigid main frame member, a socket on said main frame member for supporting a nose cutting oxy-fuel nozzle adapted to cut a kerf in the plate to form a nose, said frame member extending longitudinally of said kerf and terminating in a transversely extending guide longitudinally spaced from said nose cutting nozzle socket, a supporting arm slidably mounted in said guide and thereby slidable transversely with respect to said kerf, a bevel cutting nozzle mounted on one end of said transversely slidable supporting arm at an angle to said nose cutting nozzle, and propelling means engaging said supporting arm to slide the same with respect to its guide to move said bevel cutting nozzle toward and away from said nose cutting nozzle.

2. Plate edge preparation apparatus comprising an elongated rigid main frame member, a socket on said main frame member for supporting a nose cutting oxy-fuel nozzle adapted to cut a kerf in the plate to form a nose, said frame member extending longitudinally of said kerf and terminating in transversely extending twin guides longitudinally spaced from said nose cutting socket, twin bars slidably mounted in said guides and thereby slidable transversely with respect to said kerf, a bevel cutting nozzle mounted on one end of said twin bars at an angle to said nose cutting nozzle, and propelling means engaging said twin bars to slide the same with respect to their guides to move said bevel cutting nozzle toward and away from said nose cutting nozzle.

3. Plate edge preparation apparatus comprising an elongated rigid main frame member, a socket on said main frame member for supporting a nose cutting nozzle adapted to cut a kerf in the plate to form a nose, said frame member extending longitudinally of said kerf and terminating in a transversely extending guide longitudinally spaced from said nose cutting nozzle socket, a supporting arm slidably mounted in said guide and thereby slidable transversely with respect to said kerf, a bevel cutting nozzle mounted on one end of said transversely slidable supporting arm at an angle to said nose cutting nozzle, and a lead screw for propelling said supporting arm to slide the same with respect to its guide to move said bevel cutting nozzle toward and away from said nose cutting nozzle.

4. Plate edge preparation apparatus comprising an elongated rigid main frame member, a socket on said main frame member for supporting a nose cutting oxy-fuel nozzle adapted to cut a kerf in the plate to form a nose, said frame member extending longitudinally of said kerf and terminating in a transversely extending guide longitudinally spaced from said nose cutting nozzle socket, a supporting arm slidably mounted in said guide and thereby slidable transversely with respect to said kerf, a clamping socket mounted on the end of said supporting arm and extending transversely thereof, and a nozzle holder shank mounted in said clamping socket and extending back toward said nose cutting nozzle and terminating in a bevel cutting nozzle socket.

5. Plate edge preparation apparatus comprising an elongated rigid main frame member, a socket on said main frame member for supporting a nose cutting oxy-fuel nozzle adapted to cut a kerf in the plate to form a nose, said frame member extending longitudinally of said kerf and terminating in a transversely extending guide longitudinally spaced from said nose cutting socket, a supporting arm slidably mounted in said guide and thereby slidable transversely with respect to said kerf, a bevel cutting nozzle mounted on one end of said transversely slidable supporting arm at an angle to said nose cutting nozzle, a plate rider secured to said main frame member adjacent said nose cutting nozzle socket and having a wheel engaging said plate near said bevel cutting nozzle and thereby subject to heat therefrom, and a cooling nozzle mounted on said plate rider for discharging a cooling jet gainst the wheel surface to prevent overheating thereof by said bevel cutting nozzle.

6. Plate edge preparation apparatus comprising a frame adapted to be propelled longitudinally of a line of cut, means on said frame for supporting a first cutting nozzle, said frame having a portion extending longitudinally from said first cutting nozzle, a transverse guide at the end of said frame portion, a supporting arm slidably mounted in said guide, a longitudinal socket at the end portion of said supporting arm, a nozzle holder shank mounted in said socket and extending toward said first cutting nozzle, and a second cutting nozzle mounted on the end of said nozzle holder shank between said first cutting nozzle and said transverse supporting arm guide and disposed at an angle to said first cutting nozzle.

7. Plate edge preparation apparatus comprising an elongated frame member, a floating mounting for said frame member, a plate rider roller for supporting said frame member, screw means passing transversely through said frame member and extending laterally on opposite sides thereof, clamps slidable longitudinally of said laterally extending portions of said screw means and having sockets extending transversely thereof, means for preventing rotation of said clamps with respect to said frame member, nozzle holders having shanks extending laterally therefrom and clamped in the sockets of said clamping devices on opposite sides of said frame member, nut means having internal threads meshing and cooperating with said screw means, and handles coaxial with said screw and nut means for causing relative rotation thereof to move said nozzle holders toward and away from each other.

8. Plate edge preparation apparatus comprising an elongated rigid main frame member, a socket on said main frame member for supporting a nose cutting oxy-fuel nozzle adapted to cut a kerf in the plate to form a nose, said frame member extending longitudinally of said kerf and terminating at its front and rear ends in transversely extending guides, supporting arms slidably mounted in said guides and thereby slidable transversely with respect to said kerf, an under bevel cutting nozzle mounted on one end of the supporting arm in said front guide, and an upper bevel cutting nozzle mounted on the opposite end of the supporting arm in said rear guide.

JOHN H. ROUNTREE.

REFERENCES CITED

The following references are of record in the file of this patent:

UNITED STATES PATENTS

| Number | Name | Date |
|---|---|---|
| 1,590,651 | Schustarich | June 29, 1926 |
| 1,787,247 | Grow | Dec. 30, 1930 |
| 1,857,505 | Heineman | May 10, 1932 |
| 2,059,236 | Holslag | Nov. 3, 1936 |
| 2,146,266 | Moss | Feb. 7, 1939 |
| 2,152,213 | Rowland et al. | Mar. 28, 1939 |
| 2,202,130 | Wagner | May 28, 1940 |
| 2,206,969 | McNutt | July 9, 1940 |
| 2,253,540 | Stoneberg | Aug. 26, 1941 |
| 2,269,505 | Anderson | Jan. 13, 1942 |
| 2,283,347 | Young | May 19, 1942 |
| 2,293,853 | Rountree | Aug. 25, 1942 |
| 2,306,945 | Hebron | Dec. 9, 1942 |
| 2,317,495 | Thompson et al. | Apr. 27, 1943 |
| 2,358,772 | Brow et al. | Sept. 26, 1944 |
| 2,363,036 | Anderson | Nov. 21, 1944 |
| 2,363,828 | Anderson | Nov. 28, 1944 |
| 2,373,541 | Chelborg et al. | Apr. 10, 1945 |
| 2,381,308 | Davis | Aug. 7, 1945 |
| 2,403,514 | Franzen | July 9, 1946 |
| 2,412,281 | Mott et al. | Dec. 10, 1946 |
| 2,429,686 | Helmkamp | Oct. 28, 1947 |
| 2,443,710 | Rountree | June 22, 1948 |

FOREIGN PATENTS

| Number | Country | Date |
|---|---|---|
| 675,273 | France | Feb. 7, 1930 |